(12) United States Patent
Ong (10) Patent No.: US 8,827,336 B2
(45) Date of Patent: Sep. 9, 2014

(54) SWIVELLING PILE CLAMP

(76) Inventor: Chin Chai Ong, Kuala Lumpur (MY)

( * ) Notice: Subject to any disclaimer, the term of this patent is extended or adjusted under 35 U.S.C. 154(b) by 82 days.

(21) Appl. No.: 13/696,806

(22) PCT Filed: May 23, 2011

(86) PCT No.: PCT/MY2011/000054
§ 371 (c)(1),
(2), (4) Date: Nov. 8, 2012

(87) PCT Pub. No.: WO2011/149332
PCT Pub. Date: Dec. 1, 2011

(65) Prior Publication Data
US 2013/0062898 A1    Mar. 14, 2013

(30) Foreign Application Priority Data

May 27, 2010   (MY) .............................. PI2010001477

(51) Int. Cl.
| | |
|---|---|
| *B66C 1/00* | (2006.01) |
| *E21B 19/06* | (2006.01) |
| *E02D 13/00* | (2006.01) |
| *B25J 15/00* | (2006.01) |

(52) U.S. Cl.
CPC ............. *B25J 15/0028* (2013.01); *E02D 13/00* (2013.01)
USPC .......... 294/90; 294/102.2; 405/230; 405/232; 175/423; 166/77.52

(58) Field of Classification Search
USPC ................ 294/90, 102.2, 106, 113, 116, 902; 294/102.1, 119.2, 31.2; 405/130, 230, 232; 166/77.1, 75.14, 77.14, 77.51, 77.52, 166/77.53, 85.1, 86.1; 81/57.15, 57.16, 81/57.33, 57.34; 175/423
See application file for complete search history.

(56) References Cited

U.S. PATENT DOCUMENTS

| | | | |
|---|---|---|---|
| 7,681,649 B2* | 3/2010 | Cerovsek ...................... 166/382 |
| 7,926,577 B2* | 4/2011 | Thomas et al. ............... 166/380 |
| 7,997,333 B2* | 8/2011 | Angelle et al. ............. 166/77.52 |
| 8,002,027 B2* | 8/2011 | Angelle et al. ............. 166/77.52 |
| 2005/0006147 A1* | 1/2005 | Ayling ............................ 175/57 |

FOREIGN PATENT DOCUMENTS

| | | |
|---|---|---|
| CN | 2608559 | 3/2004 |
| CN | 2697154 | 5/2005 |
| CN | 2723519 | 9/2005 |
| CN | 201214790 | 4/2009 |
| DE | 3211213 | 9/1983 |
| EP | 1884600 | 2/2008 |

OTHER PUBLICATIONS

International Search Report for PCT/MY2011/000054, Completed by the Australian Patent Office on Aug. 1, 2011, 2 Pages.

* cited by examiner

*Primary Examiner* — Stephen Vu
(74) *Attorney, Agent, or Firm* — Brooks Kushman P.C.

(57) ABSTRACT

A pile clamp assembly to clamp a pile that consists of the following main components; top pile clamp device, the bottom pile clamp device, a plurality clamp wedges and a plurality vertical hydraulic clamps which combines to make a flat clamp wedge contact with the surface of a deviated and twisted pile. This clamping mechanism reduces bending in the driven pile by enabling the next adjoining pile to conform as much as possible to the alignment of the existing driven pile and gradually corrects the pile's vertical alignment and twist as it penetrates the ground through interactions of the unique swiveling clamp wedges.

13 Claims, 9 Drawing Sheets

SWIVELLING PILE CLAMP

CROSS-REFERENCE TO RELATED APPLICATION

This application is the U.S. national phase of PCT Appln. No. PCT/MY2011/000054 filed on May. 23, 2011, which claims priority to MY Patent Application No. PI2010001477 filed on May. 27, 2010, the disclosures of which are incorporated in their entirety by reference herein.

TECHNICAL FIELD OF THE INVENTION

When using the side pile gripping method in association with the hydraulic static pile driver, the pile may fracture or buckled due to peak stress concentrations caused by high non-uniform clamping pressure. In addition during driving, the pile may encounters uneven soil resistances along the pile sides and tip that causes the pile to deviate out of plumb and twist. To connect the next adjoining pile, the clamping methods in the prior arts will force fit the pile vertically on to a twisted and deviated driven pile resulting in a misalignment or a kink at the joint which is vulnerable to slender piles.

By using this innovative pile clamp assembly, it promotes uniform lateral gripping around the pile to give an improved verticality in the driving the pile. More importantly, this clamping mechanism reduces bending in the driven pile by enabling the next adjoining pile to conform as much as possible to the alignment of the existing driven pile and gradually corrects the pile's vertical alignment and twist as it penetrates the ground through interactions of the unique swivelling clamp wedges.

BACKGROUND OF THE INVENTION

As in CN 200720153070, the clamping force is purely derived from a simple active wedge that moves vertically to push against the passive wedge outwards to clamp against the pile. Unlike the present invention, the clamping force around the pile is not solely derived from the vertical hydraulic clamps but also further resisted by the jamming action of the clamp wedges against the circular clamp housing in response to the externally applied vertical pile driving force. In addition, for unsymmetrical wedge clamping mechanism it would be obvious that unless the active wedge contact is exactly at the centre of the passive wedge, the clamping pressure distribution on to the pile would be trapezoidal and non-uniform. However in the present innovation, if the pile's alignment remains vertical, the top and bottom circular clamp housing will make contact at two equidistant contact point from the centre of the clamps wedge to ensure that uniform pressure will result irrespective of the contact positions of the clamp wedges. Further, the clamping jaws in CN 200720153070 are released by moving the active wedge upwards but the clamping jaws do not retract unlike the current spring loaded clamp wedges.

As in CN2608559Y, although there is a top and bottom wedges, individually the clamp wedge is unsymmetrical and therefore would cause non-uniform clamping pressure as stated earlier. The curvature radius of the contact surface of the clamp wedge is larger than the device box therefore the sides of the clamp wedge is contact with the device box and there will be no rotational play of the wedge in the plan view, which means that the clamps will only grip the pile squarely and vertically. Unlike the present invention, the clamp wedges can swivel within 3 degrees in the horizontal and vertical axis like a "ball and socket" joint inside the circular clamp housing to accommodate the tilt and twist of the pile. Another advantage in the present invention is that the top and bottom circular housing moves in tandem in the opposite directions under a action and reaction force applied by the vertical hydraulic clamp while the clamp wedges are held vertically stationary with respect to the pile, therefore the lower vertical hydraulic clamps can be omitted to save costs, whereas in CN2608559Y all the individual clamps wedges are forced outwards independently for the top and bottom vertical clamps.

CNO3223773.1 uses two adjacent clamp return springs to open the non-swivelling clamp by extending and compressing the spring along the axis of the spring. However apart from allowing the spring to expand and contract along the its axis, the present invention must also allow unrestricted lateral displacement of the spring perpendicularly to the axis of the spring caused by twisting of the adjoining clamp wedges. This is achieved by placing the spring centrally to minimise the twists and allow free movements of the spring within a bell shaped hollow cavity.

SUMMARY OF THE INVENTION

The principle in hydraulic static pile driving is to securely grip the pile and push the pile down against a Kentledge. There are numerous method of clamping securely along the sides of the pile. The common method is to apply a plurality of horizontal side clamps wedges inside a box device to grip the pile in which the sides clamping force must be at least two times the vertical driving force to prevent pile slippage.

The alternative pile clamping mechanism is to use a plurality of active wedges to drive it vertically against the slanting side of passive wedges in order to move it horizontally against the sides of the pile. In this way, the horizontal force derived from the vertical wedge principle is multiplied with increasing steepness of the slanting contact wedges which is usually within 15 to 60 degrees to the vertical axis, thus smaller vertical hydraulic clamp is required as compared to the directly applied horizontal clamps method. However, due to the unsymmetrical wedge clamping mechanism it would be obvious that unless the active wedge contact is exactly at the centre of the passive wedge, the clamping pressure distribution on to the pile would be trapezoidal and non-uniform. The present invention overcomes this problem as the clamp wedge is symmetrical and by clamping the top and bottom circular housing, it displaces the clamp wedges at two equidistant contact point from the centre of the clamps wedge resulting in a central horizontal force that gives rise to a more uniform clamp pressure at all times unless the pile is out of plumb.

The cross-sectional shape of a concrete square piles is not a true square but trapezoidal, as such the clamp wedges must be able twist so that the clamp contact surface is flat against the surface of the pile to avoid crushing the pile. The present invention allows this to happen because the radius curvature of the contact sliding surface of the clamp wedge is slightly smaller than the corresponding radius curvature of the contact sliding surface of the circular clamp housing, thus allowing it to rotate about individual pivot point by about ±3°. The individual pivot point is defined by the meeting at the apex of the top and bottom contact sliding surfaces of the clamp wedge which is located directly behind the centre of the clamp wedge.

An important aspect of the present invention of this clamping mechanism is to avoid bending the piles by conforming the next adjoining pile to the alignment of the existing driven pile that has deviated out of plumb and twisted. This pile clamping mechanism the present invention has the ability to uniformly maintain full flat contact with the sides of the deviated and twisted pile by twisting the clamp wedges like a ball joint through the individual pivot point.

Another advantage in the present invention is that the clamping force around the pile is not entirely derived from the vertical hydraulic clamps but also assisted by the contribution from the inclined jamming reaction of the clamp wedges against the circular clamp housing in response to by as the externally applied vertical pile driving force. Therefore, the additional inclined jamming reaction can reduce the magnitude of the required clamp force. This pile clamp assembly is most suitable for use in the push pull pile driving as equal and opposite clamp force is maintained in both the upwards and downwards directions.

The swivelling clamp wedges mechanism unlike the prior arts also improves the verticality during the driving of the pile by gradually correcting the pile's vertical alignment and twist as it penetrates the ground. This is achieved because when the clamp wedge is rotated to align with the deviated driven pile, further resistance is encountered by the inclined jamming reaction of the clamp wedges against one side of the circular clamp housing in response to the externally applied vertical pile driving force. This uneven vertical force creates a restoring moment in the opposite rotation to the deviation of the pile alignment. Thus, as the pile penetrates the ground, the deviation and the restoring moment will gradually reduce in tandem so that the pile will self adjust to a more vertical axis.

The prior arts commonly uses either one or two separate top and bottom vertical hydraulic clamps that act directly on each separate clamp wedges inside the box device, but the present invention uses only one set of vertical hydraulic clamps for the top of the circular clamp housing that is connected to the bottom circular clamp housing by using the vertical hydraulic clamp rod to simultaneously move the clamp wedges to contact with the pile. This reverse wedge activation mechanisms is opposite to the prior arts which creates a more uniform clamping pressure as the separate vertical hydraulic clamps now acts together to push the solid and stiff circular clamp housing on to the clamp wedges rather than acting individually.

For illustration purposes, the pile clamp assembly may consists of a plurality clamp wedges, vertical hydraulic clamps, is guide shafts and push rods but they arranged in such a way to preserve the centroids to be coincident with the centroid of the pile.

DETAILED DESCRIPTION OF THE INVENTION

Referring to the drawings, like numerals indicate like components to facilitate explanation. In order to differentiate two separate entities belonging to like components, a suffix "a" or "b" is used to denote the first and second entity.

Figure 1:
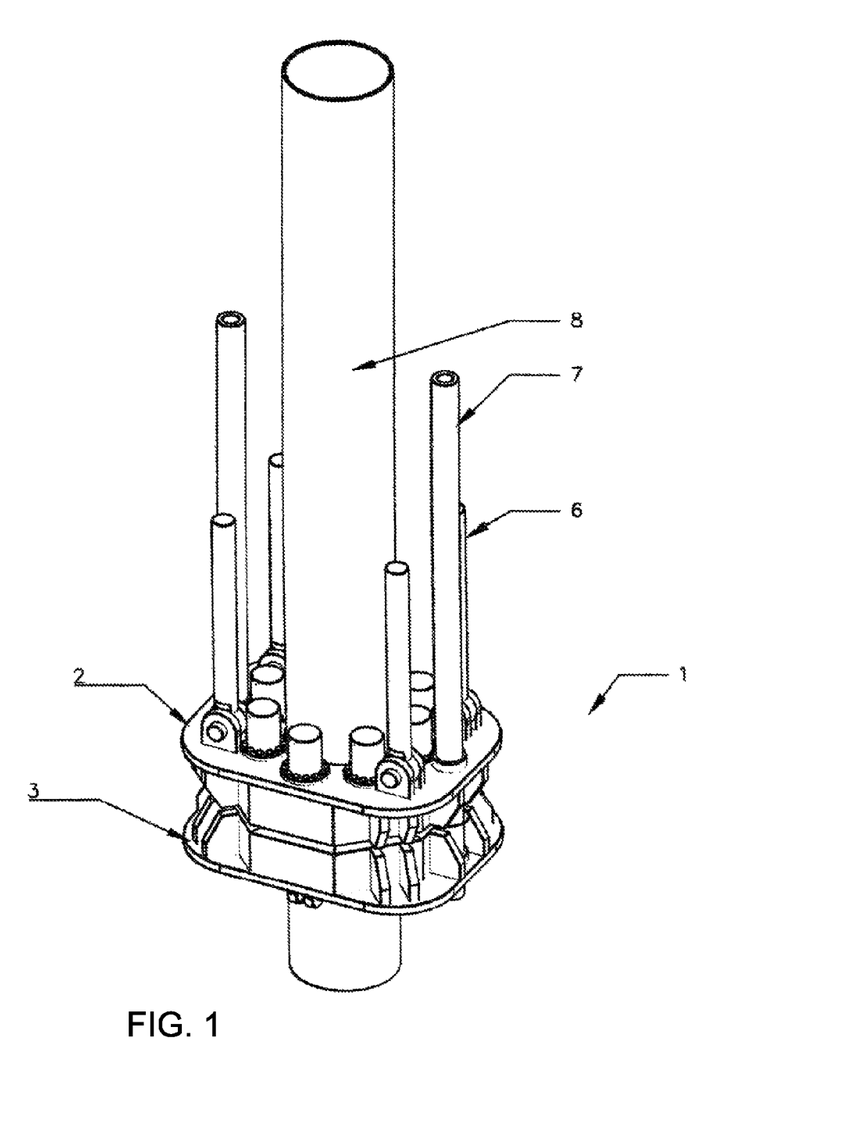
FIG. 1 shows the pile clamp assembly and attachment guide shafts to the hydraulic static pile driver.

Components of the Pile Clamp Assembly (1):

FIG. 1 shows the pile clamp assembly (1) is connected to the push rod (6) of a hydraulic static pile driver (not shown here) that slide along the guide shafts (7). The pile clamp assembly (1) has a top clamp pile device (2) and a bottom clamp pile device (3) that is moved by the set of vertical hydraulic clamps (5).

Figure 2:
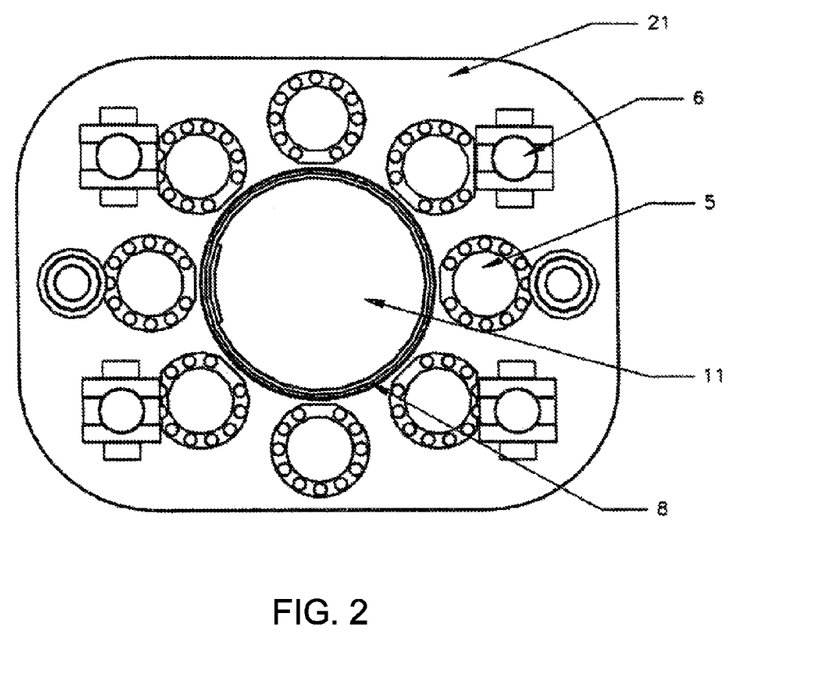
FIG. 2 shows the plan view of the top plate of the pile clamp assembly with coinciding centroid for the vertical hydraulic clamps, guide shafts, push rods and the pile.

FIG. 2 shows one possible layout of the pile clamp assembly (1) from top view. The centrality and the plurality of clamp wedges (4), vertical hydraulic clamps (5), guide shafts (7), push rods (6) is arranged to coincide with the centre of the pile (8). The opening (11) of the pile clamp assembly (1) may be circular, octagonal or any regular shape so as to accommodate the passage of the pile (8) which may be circular rectangular or a H-beam. The axis of the guide shafts (7), push rod (6) and pile (8) is parallel to the z-axis.

Figure 3A:
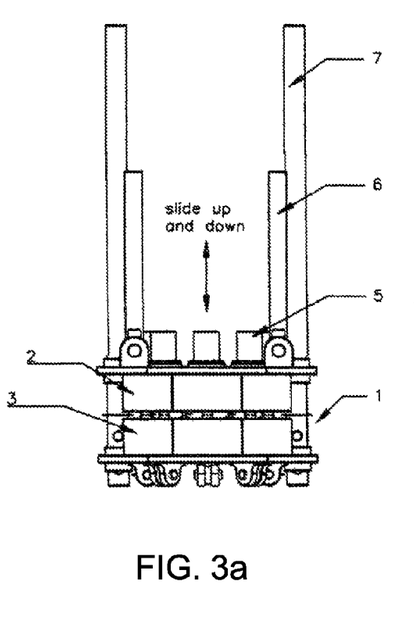
FIG. 3a-3b shows the driving sequence of the pile clamp assembly when thus up or down along the guide shafts by the push rods FIG. 4 show the perspective view of the pile clamp assembly and vertical hydraulic clamp.
Figure 3B:
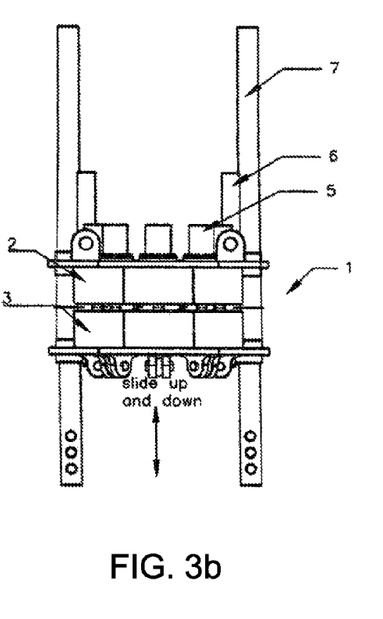

FIG. 3a shows the pile clamp assembly (1) driven down along the guide shafts (7) by the extending push rods (6) and FIG. 3b shows the pile clamp assembly (1) driven back up along the guide shafts (7) by the retracting push rods (6).

Figure 4:
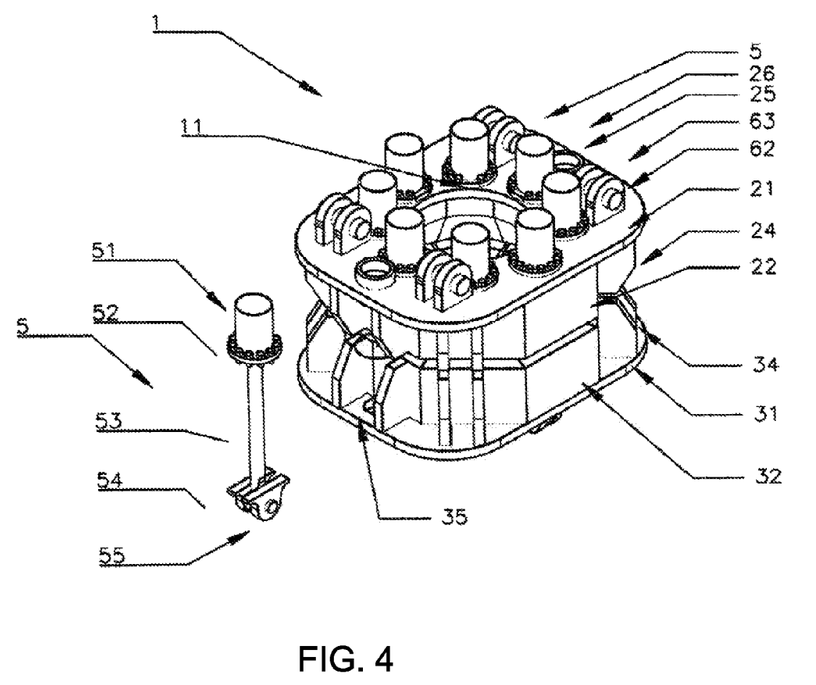

FIG. 4 show the perspective view of the pile clamp assembly (1) that consists of the following components; top pile clamp device (2), the bottom pile clamp device (3) and a plurality of vertical hydraulic clamps (5). The vertical hydraulic clamp (5) moves the top pile clamp device (2) and bottom pile clamp device (3) through the vertical hydraulic clamp rod (53) in which the ends therefore is terminated at the rod hinge (55) which is connected to a hinge (54) that is welded to the soffit of the bottom plate (31) of the bottom pile clamp device (3). The vertical hydraulic clamp (5) is secured to the top plate (21) of the top pile clamp device (2) by means of bolting (52) or screwing threads. There is a gap (12) of about 25-100 mm between the top pile clamp device (2) and bottom pile clamp device (3) that will close or open in the z-axis when the vertical hydraulic clamp (5) is activated. Brass bush guides (26) is located at the openings (25,35) to prevent wearing of the guide shaft (7)'s chromed surface. The purpose of this snugly fitted guide shaft (7) is to constrained the pile clamp assembly (1) to move in the z-axis only. The attachment of the top plates (21) and bottom plates (31) to the top circular clamp housing (22) and bottom circular clamp housing (32) respectively is strengthened by a plurality of wedge stiffeners (24,34).

Figure 5:
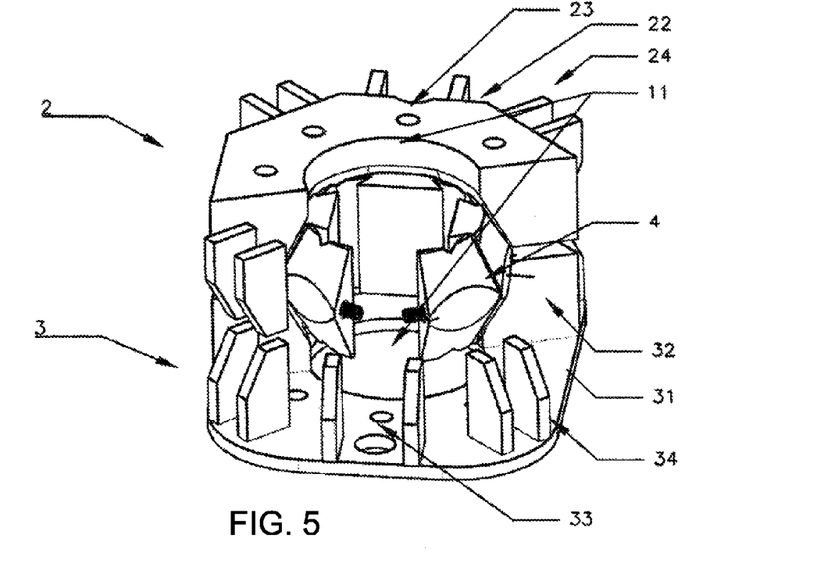
FIG. 5 shows the internal assemblage of the components of the pile clamp assembly.

FIG. 5 shows the internal assemblage of the pile clamp assembly (1) with the plurality of clamp wedges (4) interacting with the top pile clamp device (2) and the bottom pile clamp device (3). The plurality of vertical hydraulic clamps (5) have vertical hydraulic clamp rod (53) that passes through the top pile clamp device (2) and the vertical through holes (23,33) of the bottom pile clamp device (3).

Figure 6:
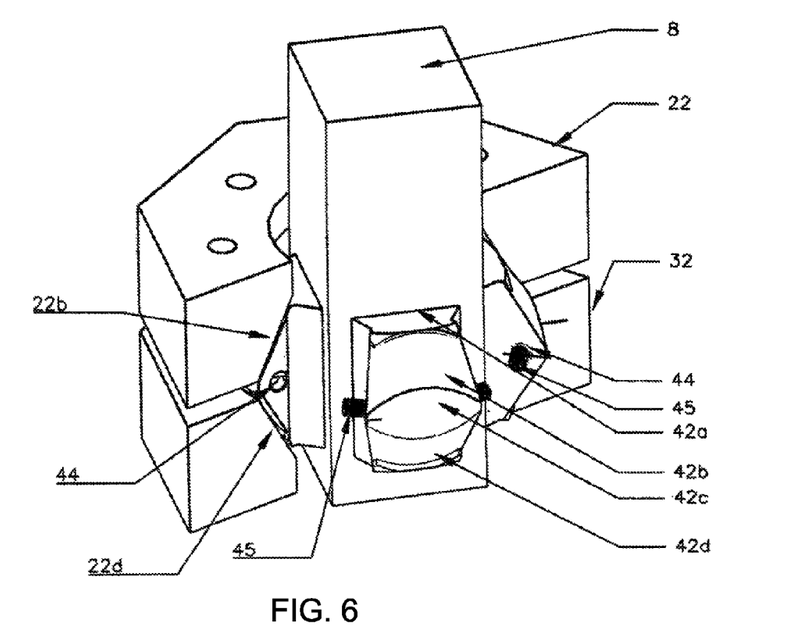
FIG. 6 shows the perspective cut away view and details of the clamp wedges gripping the pile.

FIG. 6 is the perspective cut away view of the pile clamp assembly (1) showing the clamp wedge (4) in contact with the pile (8). When the top pile clamp device (2) and bottom pile clamp device (3) are moved towards each other in the z-axis by means of the vertical hydraulic clamp (5), the contact surface (22*b*) of the top circular clamp housing (22) comes to meet the corresponding contact surface (42*b*) of the clamp wedges (4), and the contact surface (22*d*) of bottom circular clamp housing (22*d*) comes to meet the corresponding surface (42*d*) of the clamp wedges (4), such as to transmit the force from the vertical hydraulic clamps (5) on to the clamp wedges (4) to move them horizontally towards the centre (11) of the pile clamp assembly (1) thereby gripping the pile (8) uniformly in the radial directions perpendicular to the z-axis.

Figure 7:
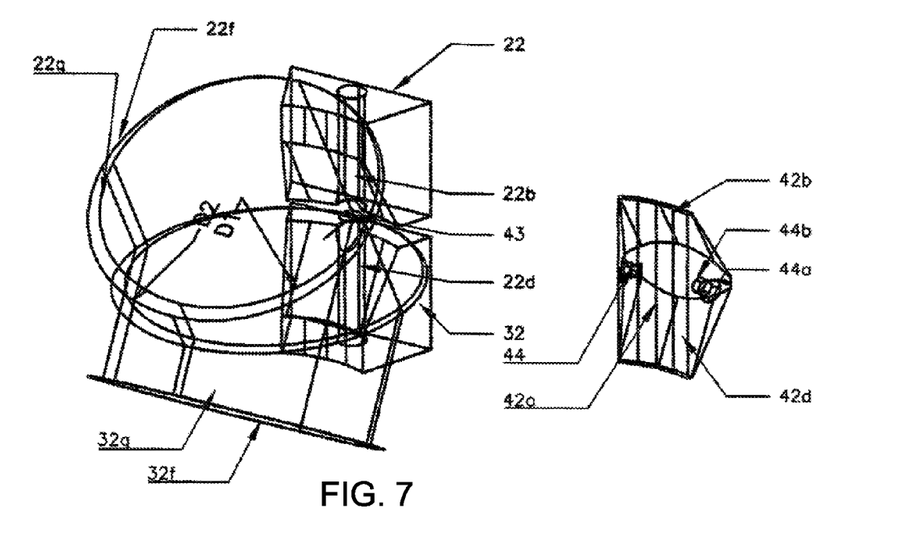
FIG. 7 shows the wire sketch of the clamp wedge and a segment of the circular clamp housing with milling cylinder orientations that created the contact surfaces for clamp wedges and the circular clamp housings.

FIG. 7 shows the wire sketch of a clamp wedge (4) and a segment of the circular clamp housing (22,32) with milling cylinder surface (22*f*,22*g*,32*f*,32*g*) orientated in such a way to create the contact surfaces (22*b*, 22*d*) of the circular clamp housing (22,32) and the corresponding contact surfaces (42*b*, 42*d*) of the clamp wedge (4) respectively. Note that the diameter of the milling cylinder (22*g*,32*g*) for the contact surface (42*b*,42*d*) is slightly smaller than the milling cylinder (22*f* 32*f*) for the contact surfaces (22*b*,22*d*) of the circular clamp housing (22,32) respectively. Hence the clamp wedge can rotate ±3° about a pivot point (43) in the x-y plane. This is advantageous as it allows the clamp wedges (4) to swivel in the x-y plane and self-adjust to meet squarely with the face of a square pile (8). At the centre sides of the clamp wedge is a hollow cavity (44) with a bell shaped opening (44*a*) and tabular cylinder opening (44*b*). When the adjoining clamp wedges (4) is twisted, the spring (45) will laterally displace perpendicularly to the axis of the spring (45) within a bell shaped opening (44*a*) when expanding or contracting the spring (45) to close or open the clamp wedges (4).

Figure 8A:
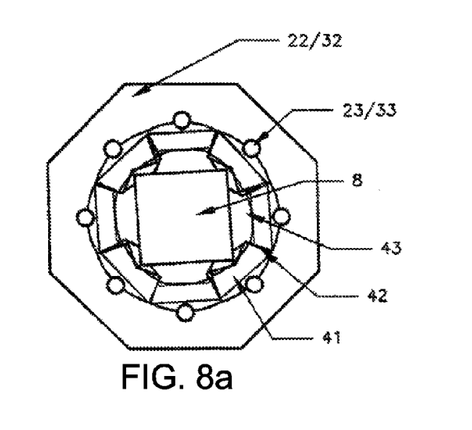
FIG. 8 show the plan view with clamping mechanism that can accommodate the twist of the square pile.
Figure 8B:
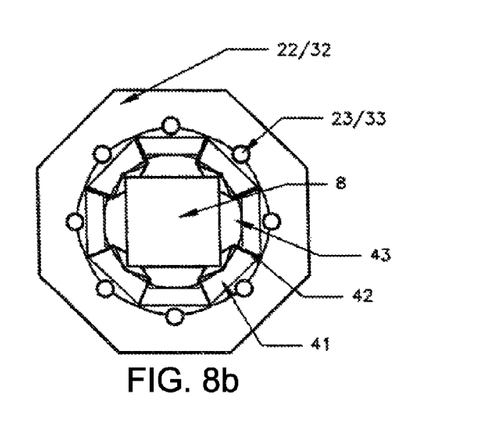

FIG. 8*a* show the plan view of the clamp wedges (4) squarely clamping the square pile (8), whereas FIG. 8*b* show that as the square pile (8) is twisted, the clamp wedges can swivel to accommodate the twist of the square pile (8).

Figure 9A:
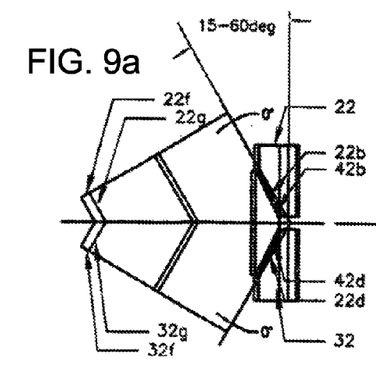
FIG. 9a-9c shows the slant of the milling cylinder between the lamp housing and the back of the clamp wedge about 0-3 degrees.
Figures 9B, 9C:
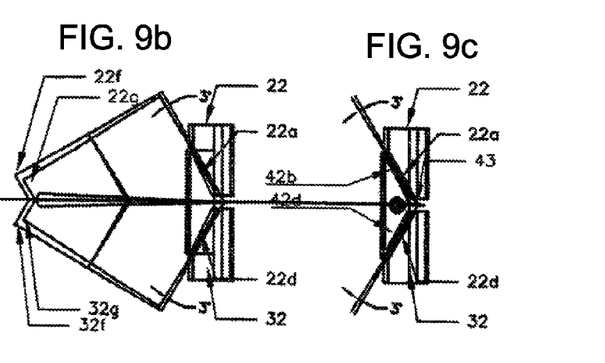

FIG. 9*a* shows the milling cylinder surface (22*f*, 32*f*) have same inclination to the z-axis as the milling cylinder surface (22*g*, 32*g*). FIG. 9*b* shows the axis of the milling cylinder surface (22*g*, 32*g*) are rotated 3° toward the centre plane of the clamp wedge (4) passing through the pivot point (43), the effect of this will allow the clamp wedge (4) to rotate freely ±3° about the pivot point (43) as unlike in the FIG. 9*a*. The advantage of this ±3° rotation allows the clamp wedge (4) to self-adjust up to ±3° vertical z-axis deviation of the pile (8).

Figure 10A:
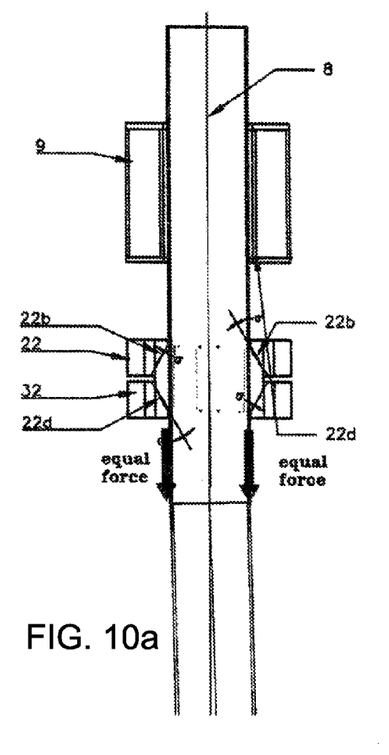
FIG. 10a-10b shows the pile clamp assembly that can swivel to accommodate a deviated pile in the z-axis and self-adjust its verticality.
Figure 10B:
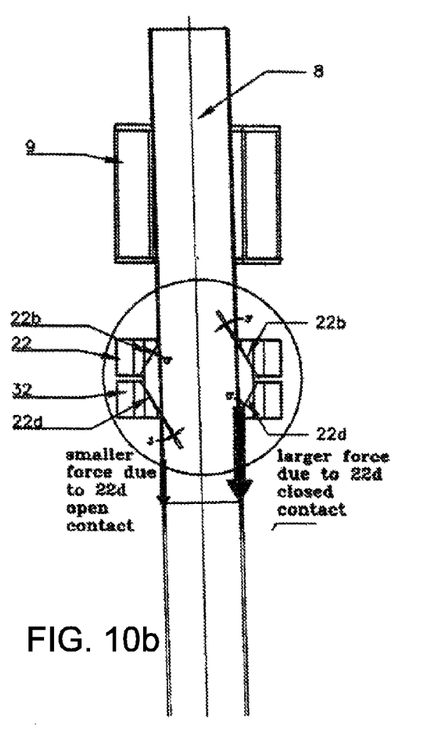
Figure 11:
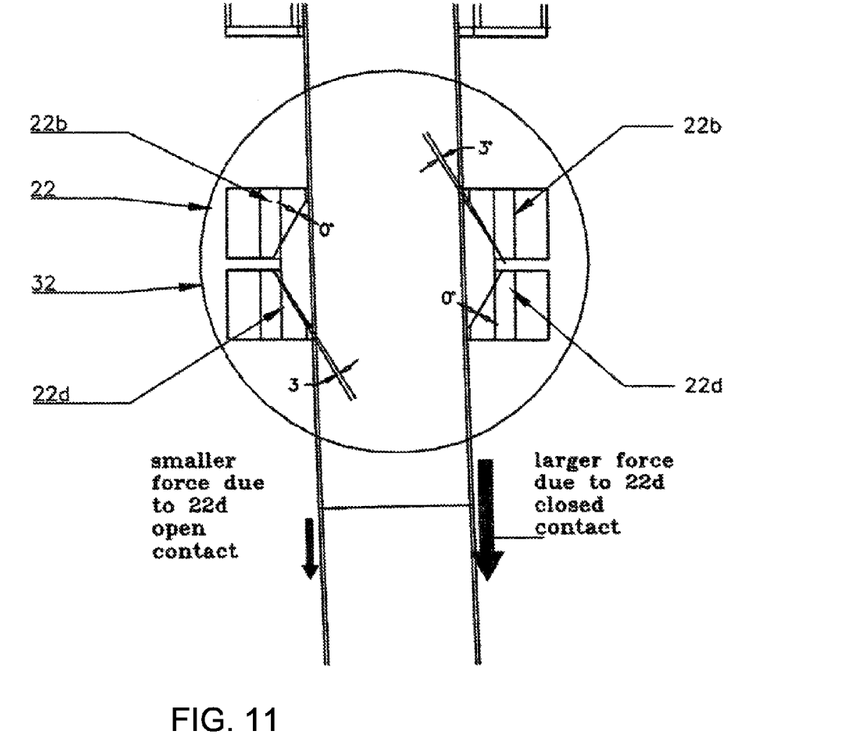
FIG. 11 shows the blown up detail of FIG. 10b

FIG. 10*a* shows the top adjoining pile (8*a*) is placed truly vertical in the z-axis, but the bottom driven pile (8*a*) is slanted in the anti-clockwise direction and hence a kink (81) is resulted that will bend and fracture the pile (8*a*,8*b*) when the axial load is applied to drive the top pile (8*b*). However, in FIG. 10*b*, the top adjoining pile (8*a*) follows the deviation of the bottom driven pile (8*a*) in the anti-clockwise direction without a kink in the pile. The most important advantage of this invention is due to the ability of the individual clamp wedge (4) to swivel about its pivot point in the x-y plane and vertical z-axis like a ball and socket joint that can gradually corrects the pile's verticality as the pile (8*a*,8*b*) penetrates the ground. This is achieved because as seen in FIG. 11 when the clamp wedge (4) is rotated in alignment with the z-axis of the deviated driven pile (8*a*), further resistance is encountered in response to the externally applied vertical pile driving force by the inclined jamming reaction of the clamp wedge (4) acting on the closed contact surface (42*d*) of the right hand side of the FIG. 10*b* and FIG. 11 against the contact surface (22*d*) on the right side of the circular clamp housing (3). This inclined jamming reaction causes an uneven vertical force that creates a restoring moment in the clockwise direction against the deviation of the pile. Thus, as the pile penetrates, the restoring moment and pile's deviation will gradually reduce in tandem causing it to self-adjust to a more vertical axis. For illustration purposes, the clamp wedge (4) can also rotate freely beyond ±3° about the pivot point (43) unless limited by the opening of the insertion guide (9) of the hydraulic static pile driver.

The invention claimed is:

1. A pile clamp assembly to clamp a pile comprising: a top pile clamp device, a bottom pile clamp device, a plurality of clamp wedges and a plurality of vertical hydraulic clamps, wherein the clamp wedges have curved cylindrical contact surfaces meeting with corresponding contact surfaces of a top circular clamp housing and a bottom circular clamp housing so that it can swivel about its unique pivot point in the x-y plane and vertical z-axis to make a flat contact with the surface of a deviated and twisted pile, permitting a top adjoining pile to follow the deviation of a bottom driven pile without a kink in the pile so as to avoid bending the pile, and the opening and closing of the swiveling clamp wedges in a ring formation is controlled by a centrally located spring that can expand or contract unrestricted even if an axis of a hollow cavity is misaligned;

the vertically movable top pile clamp device and the vertically movable bottom pile clamp device moving in tandem in opposite directions under an action and reaction force applied by one of the vertical hydraulic clamps while the clamp wedges remain vertically stationary with respect to the pile; and wherein the top pile clamp device and the bottom pile clamp device interact with the plurality of clamp wedges through the contact surfaces of the top circular clamp housing with the corresponding contact surface of the clamp wedges, and the contact surface of the bottom circular clamp housing with the corresponding contact surface of the clamp wedges.

2. The pile clamp assembly of claim 1 wherein a push rod of a hydraulic static pile driver is slideable along guide shafts.

3. The pile clamp assembly of claim 1 wherein the vertical hydraulic clamps, guide shafts and push rods are arranged in such a way to preserve centroids to be coincident with centroid of the pile.

4. The pile clamp assembly of claim 1 wherein any tubular pile can be clamped by adapting to a shape of the clamp wedges to conform with the corresponding shape of the pile.

5. The pile clamp assembly of claim 1 wherein an equal and opposite clamp force is maintained during pile driving in the upwards and downwards directions.

6. The pile clamp assembly of claim 1 wherein the vertically movable top pile clamp device and the vertically movable bottom pile clamp device connected together via a vertical hydraulic clamp rod which passes vertically through holes of the pile clamp assembly.

7. The pile clamp assembly of claim 1 wherein a milling cylinder for the contact surface of the clamp wedges is slightly smaller than a milling cylinder surface for the corresponding contact surfaces of the circular clamp housing so that clamp wedge can rotate ±3° in the x-y plane inside the circular clamp housing.

8. The pipe clamp assembly of claim 1 wherein an axis of the milling cylinder surface is rotated 3° from the inclination to the x-axis of the milling cylinder surface toward a center plane of the clamp wedge passing through the pivot point to allow the clamp wedge to rotate up to ±3° in the vertical z-axis.

9. The pipe clamp assembly of claim 8 wherein the milling cylinder surface does not necessarily be a mirror image of the axis of the milling cylinder surface.

10. The pile clamp assembly of claim 8 wherein the milling cylinder surface are curved surfaces which can be either a cylindrical, elliptical or any mathematical function of a smooth surface.

11. The pile clamp assembly of claim 1 wherein center sides of the clamp wedge is a hollow cavity with a bell shaped opening and tabular cylinder opening that allows unrestricted lateral displacement of the spring perpendicularly to the axis within the confines of the spring bell shaped opening.

12. The pile clamp assembly of claim 1 wherein apart from a horizontal clamping force that is derived from the vertical hydraulic clamps, a resolved horizontal resistant force can be obtained from an inclined jamming reaction corresponding to a magnitude of the externally applied vertical pile driving force acting on the closed contact surfaces of the clamp wedges against the corresponding contact surfaces of the lower circular clamp housing.

13. The pile clamp assembly of claim 12 wherein when an inclined jamming reaction causes an uneven vertical force, a restoring moment is created in the opposite direction to the deviation of the pile causing it to self adjust to a more vertical axis.

\* \* \* \* \*

UNITED STATES PATENT AND TRADEMARK OFFICE
CERTIFICATE OF CORRECTION

| | | |
|---|---|---|
| PATENT NO. | : 8,827,336 B2 | Page 1 of 1 |
| APPLICATION NO. | : 13/696806 | |
| DATED | : September 9, 2014 | |
| INVENTOR(S) | : Ong | |

It is certified that error appears in the above-identified patent and that said Letters Patent is hereby corrected as shown below:

In the Claims

Column 6, Line 62, Claim 8:

After "The" delete "pipe clamp assembly" and
Insert --pile clamp assembly--.

Column 7, Line 1, Claim 9:

After "The" delete "pipe clamp assembly" and
Insert --pile clamp assembly--.

Column 7, Line 1, Claim 9:

After "cylinder surface" delete "does not necessarily be" and
Insert --is not necessarily--.

Signed and Sealed this
Twenty-third Day of June, 2015

Michelle K. Lee
*Director of the United States Patent and Trademark Office*